Sept. 1, 1964  B. B. OHNSTAD  3,147,014
FOAM GASKET JOINT FOR CONCRETE PIPE AND METHOD OF MAKING SAME
Filed July 20, 1962
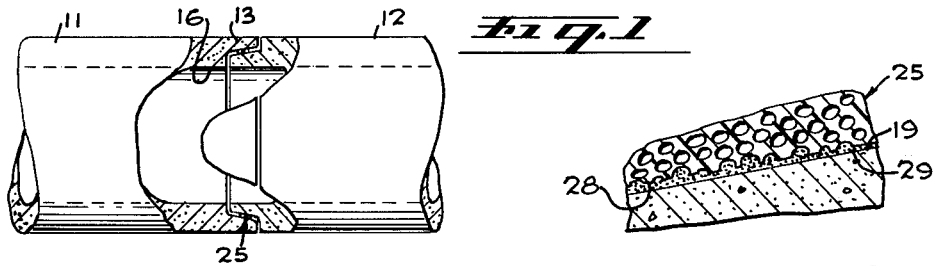
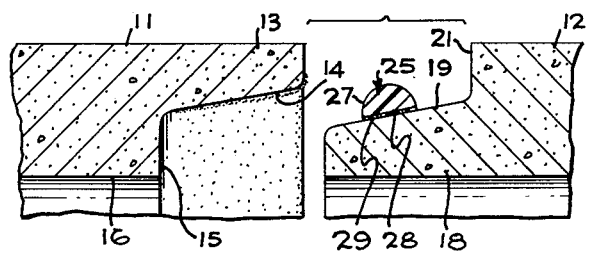
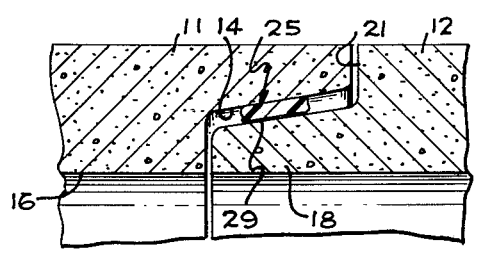 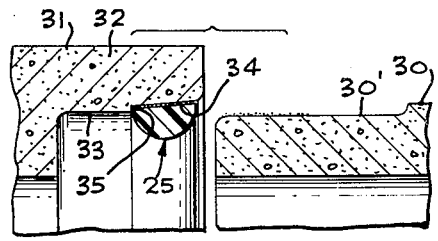
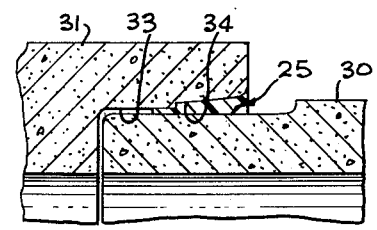 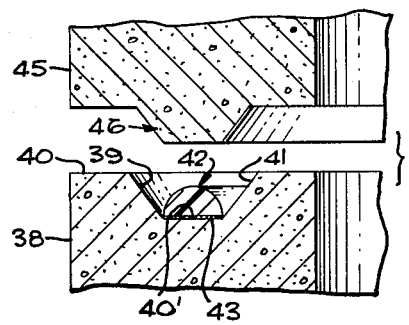
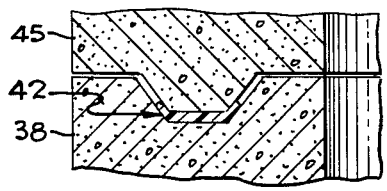
BURL B. OHNSTAD
INVENTOR.
BY Mason & Graham
ATTORNEYS

United States Patent Office 3,147,014
Patented Sept. 1, 1964

3,147,014
FOAM GASKET JOINT FOR CONCRETE PIPE AND METHOD OF MAKING SAME
Burl B. Ohnstad, South Gate, Calif., assignor to American Pipe and Construction Co., South Gate, Calif., a corporation of California
Filed July 20, 1962, Ser. No. 211,289
2 Claims. (Cl. 277—189)

This invention has to do with the forming of joints between sections of concrete pipe.

In the installation of concrete pipe for irrigation, culverts, sewers and other low pressure applications it is common practice to fill the annular space between adjoining pipe sections with cement mortar grout to prevent leakage and infiltration. Such joints are difficult to install and inspect and, once hardened, provide an inflexible joint. As a result, due to unstable trench conditions, non-uniform loading, temperature expansion or contraction and mortar shrinkage, cracks frequently develop in the joint thereby destroying its effectiveness as a seal.

Various flexible-type joint materials have been used, but these have been found to have serious limitations. For example, mastics and plastic materials have been used, but these are difficult to apply, are subject to cold flow and lack the resilience needed to maintain a watertight seal after movement of the joint occurs. Foam plastics of the open-cell type have been used either alone or impregnated with various materials, but these are ineffective as a water seal unless compressed to a very small fraction of their initial volume. Also, solid rubber and plastic gaskets of various designs have been used, but these function satisfactorily only when the mating joint surfaces are free of voids and surface roughness typical of concrete surfaces. Such solid materials are relatively unyielding and tend to be deflected from the sealing surface by protrusions and tend to span any surface voids.

It therefore is an object of this invention to provide a novel seal for use in effecting a liquid-tight joint between adjacent ends of interfitting concrete pipe sections and particularly such a seal which does not have the disadvantages of various materials heretofore used as pointed out above.

Another object is to provide a novel method of forming a joint or seal between two interfitting concrete pipe sections or members of other material.

A further object is to provide a positive seal or gasket means for concrete pipe joints which is easy to install, is economical, and provides excellent sealing.

More particularly it is an object to provide such a seal that eliminates the need for accurate joint configuration of the concrete pipe sections and the need for close joint tolerances such as required where solid rubber or plastic gaskets are used.

A further object is to provide a novel seal or joint which has the following properties: the ability to flow into surface imperfections when compressed between two pipe sections, thus insuring a watertight seal; a gasket which is physically stable and maintains a watertight seal in spite of age, and variations in temperature and pressure; and a seal which is chemically unaffected by joint lubricants and chemicals likely to be encountered in corrosive soil environments.

Another object is to provide a gasket which will tolerate impact, abrasion and severe abuse without serious damage and to provide one which has a low coefficient of friction and compressibility thereby minimizing the force required to close the pipe joint and eliminating the need of jacks and other special equipment commonly required for the purpose.

These and other objects will be apparent from the drawing and the following description. Referring to the drawings:

FIG. 1 is an elevational view of two pipe sections broken away to show the joint therebetween;

FIG. 2 is an enlarged fragmentary longitudinal sectional view showing the joint of FIG. 1;

FIG. 3 is an enlarged fragmentary detail view showing the adjacent portions of the gasket and concrete pipe to which it is attached;

FIG. 4 is a view similar to FIG. 2 but showing the completed joint;

FIG. 5 is a view similar to FIG. 2 but showing a modified type of joint;

FIG. 6 is a view similar to FIG. 4 but showing the joint of FIG. 5;

FIG. 7 is a view similar to FIG. 2 but showing still a different joint; and

FIG. 8 is a view similar to FIG. 4 but showing the joint of FIG. 7 completed.

More particularly describing the invention, numeral 11 designates one section of concrete pipe and numeral 12 designates an adjoining section which is shown joined thereto. Section 11 is provided with a recessed end 13 provided with a flared frusto-conical inner wall 14 and a shoulder 15 between it and the main inner wall surface 16. Section 12 has a spigot end portion 18 having a tapered frusto-conical outer surface 19, which generally corresponds in angle to the surface 14 of section 11, and a shoulder 21.

In order to form a liquid-tight joint between two sections of pipe I provide an annular gasket 25. This is securely attached to one of the surfaces 14 or 19 and in the form of the invention illustrated the gasket is shown secured or affixed to the spigot end surface 19. The gasket 25 is formed of a foam-type plastic, preferably polyethylene, and has a closed cell structure. The gasket shown has an outer surface 27 which is semicircular in cross section and a laterally flat inner surface 28. The latter surface is characterized by the fact that the cellular structure at this surface is cut or ruptured. This can be accomplished by any suitable method. For example, the gasket can be made by utilizing extruded or otherwise-formed round stock of polyethylene foam or other suitable foam rubber or foam plastic with a closed cell structure and cutting or sawing this lengthwise down the middle. Suitable lengths are cut from the resulting half sections and made into annular members by joining the ends, as by heat-sealing.

The gasket 25 is firmly bonded to the spigot surface 19 (or surface 14) by an adhesive or bonding agent 29 which will serve the purpose. The adhesive enters the ruptured cellular inner surface 28 of the gasket and thus firmly bonds thereto. At the same time it also attaches firmly to the concrete.

In order to make up or complete the joint, a suitable lubricant, such as vegetable oil, is provided on the inner surface 14 of the member 11. The two pipe sections can then be brought together by relative axial movement until the joint is completed as shown in FIG. 4 without damage to the gasket.

In FIGS. 5 and 6 I show another form of the invention such as might be applied to a type of pipe used in sewer construction and the like wherein numerals 30 and 31 designate the pipe sections. In this type of pipe the member 30 has a reduced spigot section 30' which is received in an enlarged bell end 32 of the other section. The bell end has a cylindrical wall 33 and, outwardly of this, a tapered or conoidal surface 34 beyond a shoulder 35. In this form of the invention the gasket is affixed to the surface 34.

In FIGS. 7 and 8 I show a type of joint useful in manhole sections and the like wherein the section 38 is shown as having an annular groove 39 in its end wall 40. The groove has a flat bottom wall 40' and tapered side walls 41. Preferably the gasket, designated 42, is secured to the bottom wall 40', being provided with a flat ruptured cell, axially facing, surface 43 for the purpose. The other section, 45, is provided with an annular rib 46 adapted to fit within the groove 39, the rib having a configuration in cross section similar to that of the groove.

Although I have illustrated and described preferred forms of my invention, I contemplate that various changes and modifications can be made therein without departing from the invention, the scope of which is indicated by the following claims.

I claim:

1. In a joint for concrete pipe sections and the like, a pair of pipe sections having interfitting end portions, an annular gasket compressed between said interfitting end portions, said gasket being formed of a material chosen from the class consisting of foam rubber and foam plastics and characterized as having a closed-cell structure, said gasket having a ruptured cell surface throughout an annular area adjacent the surface of the end portion of one of said pipe sections, and a bonding agent securely affixing said gasket to an end portion of one of said pipe sections, said bonding agent covering the surface area of ruptured cell structure of the gasket and penetrating the ruptured cells thereof.

2. The joint set forth in claim 1 in which said gasket is formed of polyethylene.

References Cited in the file of this patent
UNITED STATES PATENTS

| | | |
|---|---|---|
| Re. 24,799 | Miller | Mar. 15, 1960 |
| 2,116,705 | Marx et al. | May 10, 1938 |
| 2,793,885 | Hoyer | May 28, 1957 |